(12) United States Patent
De Luca et al.

(10) Patent No.: US 11,639,864 B2
(45) Date of Patent: May 2, 2023

(54) FLOW SENSOR

(71) Applicant: Flusso Limited, Cambridgeshire (GB)

(72) Inventors: Andrea De Luca, Cambridgeshire (GB); Ethan Gardner, Warwickshire (GB); Syed Zeeshan Ali, Cambridgeshire (GB); Florin Udrea, Cambridgeshire (GB)

(73) Assignee: Flusso Limited, Cambridgeshire (GB)

( * ) Notice: Subject to any disclaimer, the term of this patent is extended or adjusted under 35 U.S.C. 154(b) by 249 days.

(21) Appl. No.: 17/074,898

(22) Filed: Oct. 20, 2020

(65) Prior Publication Data

US 2021/0116282 A1   Apr. 22, 2021

(51) Int. Cl.
 *G01F 1/688* (2006.01)
 *G01F 1/696* (2006.01)

(52) U.S. Cl.
 CPC .......... *G01F 1/6888* (2013.01); *G01F 1/6965* (2013.01)

(58) Field of Classification Search
 CPC .... G01F 1/6888; G01F 1/6965; G01F 1/6845; G01F 1/684; G01F 1/6847; G01F 1/69; G01F 1/696
 See application file for complete search history.

(56) References Cited

U.S. PATENT DOCUMENTS 5,600,174 A * 2/1997 Reay .................... G01F 1/6845
 257/470
6,460,411 B1 10/2002 Kersjes
6,763,710 B2 * 7/2004 Mayer .................. G01F 1/6845
 73/204.11

(Continued)

FOREIGN PATENT DOCUMENTS

CA  2496204 A1  8/2005
EP  3076137 A1  10/2016
(Continued)

OTHER PUBLICATIONS

B. Van Oudheusden, "Silicon flow sensors," in Control Theory and Applications, IEE Proceedings D, 1988, pp. 373-380.

(Continued)

*Primary Examiner* — Freddie Kirkland, III
(74) *Attorney, Agent, or Firm* — Kilpatrick Townsend & Stockton LLP

(57) ABSTRACT

There is disclosed herein a flow sensor comprising: a first substrate comprising an etched portion; a dielectric layer located on the first substrate, where the dielectric layer comprises at least one dielectric membrane located over the etched portion of the first substrate; a first heating element and a second heating element located on or within the dielectric membrane; and a controller coupled with the first heating element and the second heating element. The first heating element and the second heating element are arranged to intersect one another within or over an area of the dielectric membrane. The controller is configured to: take a measurement from the second heating element; determine a calibration parameter using the measurement from the second heating element; take a measurement from the first heating element; and determine a flow rate through the flow sensor using the determined calibration parameter and the measurement from the first heating element.

20 Claims, 10 Drawing Sheets

(56) References Cited

U.S. PATENT DOCUMENTS

| | | | |
|---|---|---|---|
| 11,035,709 B2* | 6/2021 | De Luca | G01F 15/024 |
| 11,067,422 B2* | 7/2021 | Udrea | G01F 1/698 |
| 11,073,415 B2* | 7/2021 | Udrea | G01F 1/6845 |
| 11,186,479 B2* | 11/2021 | deKoninck | B81B 7/0019 |
| 2002/0011104 A1 | 1/2002 | Yamakawa | |
| 2003/0115952 A1* | 6/2003 | Mayer | G01F 1/6845 |
| | | | 73/204.26 |
| 2014/0352423 A1 | 12/2014 | Kurz | |
| 2018/0038811 A1 | 2/2018 | Hornung | |
| 2019/0301909 A1* | 10/2019 | Nakano | G01F 1/6842 |
| 2019/0331514 A1* | 10/2019 | De Luca | G01F 1/6845 |
| 2020/0049539 A1* | 2/2020 | De Luca | G01F 1/6986 |
| 2022/0120701 A1* | 4/2022 | Udrea | G01N 25/18 |
| 2022/0120702 A1* | 4/2022 | Udrea | G01F 1/6888 |
| 2022/0268611 A1* | 8/2022 | Gardner | G01F 1/692 |

FOREIGN PATENT DOCUMENTS

| | | |
|---|---|---|
| GB | 2558895 A | 7/2018 |
| WO | 2016096459 A1 | 6/2016 |
| WO | 2016137826 A1 | 9/2016 |
| WO | 2016180760 A1 | 11/2016 |

OTHER PUBLICATIONS

B. Van Oudheusden, "Silicon thermal flow sensors," Sensors and Actuators A: Physical, vol. 30, pp. 5-26, 1992.

N. Nguyen, "Micromachined flow sensors—A review," Flow measurement and Instrumentation, vol. 8, pp. 7-16, 1997.

Y.-H. Wang et al., "MEMS-based gas flow sensors," Microfluidics and nanofluidics, vol. 6, pp. 333-346, 2009.

J. T. Kuo et al., "Micromachined Thermal Flow Sensors—A Review," Micromachines, vol. 3, pp. 550-573, 2012.

H. Ghorbani, "Prediction of oil flow rate through an orifice flow meter: Artificial Intelligence alternatives compared", in Petroleum, 2018.

GB Search and Examination Report dated Jul. 21, 2020 for Corresponding GB Application No. 1915213.1.

* cited by examiner

FLOW SENSOR

FIELD

The present disclosure relates to flow sensors, in particular but not exclusively, to MEMS based thermal flow sensors.

BACKGROUND

Thermal fluid flow sensors utilise the thermal interaction between the sensor itself and the fluid. Depending upon the physical phenomena governing the interaction, flow sensors can be can be classified into the following three categories:
  (i) anemometric sensors that measure the convective heat transfer induced by fluid flow passing over a heated element;
  (ii) calorimetric sensors that detect the asymmetry of the temperature profile generated by a heated element and caused by the forced convection of the fluid flow; and
  (iii) time of flight (ToF) sensors that measure the time elapsed between the application and the sensing of a heat pulse.

Reviews of thermal fluid flow sensor have been published in (B. Van Oudheusden, "Silicon flow sensors," in Control Theory and Applications, IEE Proceedings D, 1988, pp. 373-380; B. Van Oudheusden, "Silicon thermal flow sensors," Sensors and Actuators A: Physical, vol. 30, pp. 5-26, 1992; N. Nguyen, "Micromachined flow sensors-A review," Flow measurement and Instrumentation, vol. 8, pp. 7-16, 1997; Y.-H. Wang et al., "MEMS-based gas flow sensors," Microfluidics and nanofluidics, vol. 6, pp. 333-346, 2009; J. T. Kuo et al., "Micromachined Thermal Flow Sensors-A Review," Micromachines, vol. 3, pp. 550-573, 2012). Further background can also be found in U.S. Pat. No. 6,460,411 by Kersjes et al.

Generally, a thermal flow sensor comprises a heating element and a temperature sensing element thermally isolated from a substrate (e.g. embedded within a membrane, a bridge, a cantilever, etc.). Both heating and temperature sensing elements are typically positioned in the most thermally isolated area (e.g. in the centre of a membrane, in the centre of a bridge, and the end of a cantilever, etc.).

One disadvantage of thermal flow sensors is that they must be calibrated to a specific medium, because each medium has different thermal properties, and if thermal properties change (e.g. because the medium changes during sensor operation), a measurement error in relation to the flow velocity or flow rate is introduced.

CA02496204 shows a thermal flow mass meter with high accuracy over a wide temperature range. The flow meter comprises two resistive temperature detectors (RTDs) in a bridge configuration. The output of the bridge goes through a signal conditioner and a balancer to provide a temperature compensated flow rate output as well as a temperature output.

EP 3076137 shows a flow sensor, and corresponding methods, capable of determining the presence of a gas bubble in a liquid and thus able to distinguish from a no-flow condition where the sensor is filled with liquid but the liquid stands still (zero flow rate). This is achieved by an analysing circuit. The analysing circuit is also able to provide as output the flow rate or velocity of the liquid.

In H. Ghorbani, "Prediction of oil flow rate through an orifice flow meter: Artificial Intelligence alternatives compared", in Petroleum, 2018, a variety of algorithms were used to increase the accuracy of orifice flow meters.

US2018/0038811A1 relates to a method for determining a parameter of an unknown flow. Said parameter may be a calorific value of the fluid or a parameter related thereto. The method is applied to a sensor device, preferably a CMOS flow sensor, comprising a heating element and at least one temperature element. A computer program is also provided that carries out the determination of the parameter of the unknown flow.

WO2016096459A1 relates to a thermal flow meter having at least three sensor elements and an electronic unit, and a method of operating such a flowmeter. In addition, a statement on the state of at least one of the at least three sensor elements can be made. The flowmeter has a diagnostic function.

WO2016/137826A1 shows a MEMS thermal flow sensor for measuring the flow rate of a fluid without need for calibration of the flow sensor for that specific fluid. WO2016/180760A1 shows a method of ascertaining a product of the heat capacity and the density, or a value derived thereof, on the basis of the ascertained heat conductivity and flow rate with the aid of a thermal flow sensor.

SUMMARY

Presently available sensors have, among others, one or more of the following disadvantages:
  sensing elements that cannot be fabricated in semiconductor technology;
  compensation is limited temperature only, and does not compensate for other parameters;
  difficulty in determining appropriate calibration parameters.
  high power dissipation, low sensitivity and slow dynamic response of the sensor;
  mechanical fragility and vibration sensitivity;
  reduced mechanical robustness of sensor supporting structures;
  complex fabrication processes;
  manufacturing processes that are not fully CMOS compatible; and
  manufacturing processes that are expensive.

The devices of the present disclosure are advantageous over the state-of-the-art devices for at least the following reasons:
  thermal isolation of the heated element which reduces power dissipation, increases sensitivity and provides a fast, dynamic response of the sensor;
  reduced mechanical fragility and vibration sensitivity of the membrane structure compared to a beam structure;
  a suitable dielectric material used for the dielectric membrane improves mechanical robustness of the membrane;
  a suitable dielectric material used for the dielectric membrane reduces power dissipation, increases sensitivity and provides a fast, dynamic response of the sensor;
  discontinuities within the membrane mitigate power dissipation, sensitivity and dynamic response issues; and
  the devices are fully CMOS compatible and therefore can be manufactured using fully CMOS compatible processes.

Aspects and preferred features are set out in the accompanying claims.

According to a first aspect of the present disclosure, there is provided a flow sensor comprising: a semiconductor (first) substrate comprising an etched portion; a dielectric region located on the semiconductor substrate, wherein the dielectric region comprises at least one dielectric membrane located over the etched portion of the semiconductor substrate; a first heating element located on or within the dielectric membrane; a second heating element located one or within the dielectric membrane, wherein the first heating element and the second heating element are arranged to intersect one another within an area of the dielectric membrane; and a controller (or readout system) coupled with the first heating element and the second heating element, wherein the controller is configured to: take a measurement from the second heating element; determine a calibration parameter using the measurement from the second heating element; take a measurement from the first heating element; determine a flow rate or a differential pressure through the flow sensor using the determined calibration parameter and the measurement from the first heating element.

The differential pressure measured is across the sensor, or may be measured as the differential pressure across the ports of the sensor package. The flow through the sensor package and the differential pressure across it are related. The sensor may be characterised/calibrated either for a known flow(s) or known differential pressure(s), or both. The sensor may then be used to measure flow or differential pressure or both, dependent on what it was characterised/calibrated for.

The controller may be formed on the same chip as the flow sensor or may be formed within the same flow sensor assembly or package.

The dielectric region may comprises a dielectric layer or a plurality of layers including at least one dielectric layer. The dielectric layer or layers may include one or more layers of silicon dioxide and silicon nitride. The dielectric layer or layers can also be other materials such as aluminium oxide.

The heating element may be fully embedded or partially embedded within the dielectric membrane.

Generally speaking, a dielectric membrane region may be located immediately adjacent to the etched portion of the substrate. The dielectric membrane region corresponds to the area of the dielectric region above the etched cavity portion of the substrate. Each dielectric membrane region may be over a single etched portion of the semiconductor substrate. The membrane shape can be rectangular or circular, or rectangular with rounded corners.

The present disclosure improves upon the existing state of the art by providing a thermal flow sensor comprising: semiconductor substrate with an etched portion, dielectric layer or layers attached to the semiconductor substrate, and the region of the dielectric layer or layers adjacent to the etched portion of the substrate being referred to as a dielectric membrane, at least two hotwire heaters embedded within or on top of the membrane such that the two hotwires are at an angle to each other, with one hotwire perpendicular or close to perpendicular to the direction of the fluid flow. The first heater may be embedded within the membrane perpendicular or within 10° to the direction of flow, and the second heater may be embedded within the membrane at an angle of at least 10° to the first heater.

The semiconductor substrate material may be any of silicon, gallium nitride, gallium arsenide, silicon carbide or germanium. The semiconductor substrate would preferably be silicon, but optionally can also be other semiconductor materials such as germanium, silicon carbide, gallium nitride or gallium arsenide.

In use, the first heating element (or heater) may extend in a direction perpendicular to the direction of flow through the sensor. The heating element may not be at an exact right angle to the direction of flow, and may extend in a diagonal direction or at an acute angle to the direction of flow however one component of the extension of the heating element may be perpendicular to the flow. Optionally, the first heating element may be substantially perpendicular or may be arranged at an angle within 10° to the direction of flow through the sensor.

The second heating element may be arranged at an angle of at least 10° to the first heating element. In use, the second heating element (or heater) may extend in a direction parallel to the direction of flow through the sensor. The second heating element may not be exactly parallel to the direction of flow, and may extend in a diagonal direction or at an acute angle to the direction of flow however one component of the extension of the second heating element may be parallel to the flow. The second heating element may be perpendicular at an angle of 90° to the first heating element, or may be located at an acute angle to the first heating element.

Two hotwire heaters may be provided and the two hotwire heaters may be perpendicular to each other with one hotwire aligned or approximately aligned to the direction of the fluid flow and the other hotwire perpendicular or approximately perpendicular to the direction of the fluid flow.

The first heater may be perpendicular to the direction of fluid flow and the second heater may be at an angle of 90° to the first heater.

In such a system the use of the heater parallel to the fluid flow provides information that can be used to determine if the fluid is in laminar or turbulent flow, and further can be used to determine the thermal properties of the fluid flowing, allowing more accurate selection of calibration parameters to apply. In laminar flow, the heater parallel to the fluid flow will not be affected by the fluid flow (or will be affected less by the fluid flow), however in turbulent flow it will be greatly affected. The heater perpendicular to the flow direction is affected by both the laminar and turbulent flow and so cannot be used for this purpose.

Similarly, when fluids with different material properties (especially different thermal conductivities) are used, this can also be detected by the heater parallel to the flow direction as it will affect the power consumption of the heater. Again this cannot be detected by the heater perpendicular to the flow as it is also affected by the fluid flow.

The heaters can also be at different angles (but at least 10°) rather than perpendicular to each other. For example, a first heater could be exactly perpendicular to the direction of flow, while the second heater could be at 60° angle to the first heater. Furthermore there could also be a third heater at 60° angle to both the first and second heater. More heaters and other angle values are also possible.

The first heating element and the second heating elements may be resistive hotwire heaters.

The change in the resistance of the heating elements is associated with the flow rate, speed, volume or mass flow rates, or the differential pressure across the sensor. The heating element could be maintained in a constant temperature or constant resistance mode by modifying the power supplied to the heater element. In this case, one can measure the change in the power due to the flow rate, velocity, volume or mass flow rates.

The two hotwire heaters may be resistive heaters made of a CMOS material such as aluminium, polysilicon, single crystal silicon, tungsten, titanium or copper. They may also be a non-CMOS material such as platinum, gold, or a virtual charge layer (e.g. bidimensional electron gas) formed at the interface of a heterostructure. The resistive heaters may have further adhesive or anti-diffusion material layers.

Alternatively one or more of the heating elements can be a diode or transistor.

The readout system may be integrated on the same chip as the flow sensor. The readout system may be part of circuitry integrated on the same chip as the flow sensor.

Alternatively the readout system may be on a separate chip, but in the same package or assembly as the flow sensor. The readout system may be part of circuitry on a separate chip within the same package.

Alternatively the readout system may be external to the package.

The readout system may store a number of possible calibration parameters, or equations to calculate the calibration parameters based on the readings from the second heater.

The readout system may be designed such that it measures the reading from both the hotwires, where the reading from the hotwire perpendicular to the fluid flow (the first heating element) is used to determine the rate of fluid flow, and the reading from the hotwire parallel to the fluid flow (the second heating element) is used to determine the calibration parameter to use to determine the final flow value.

An example readout system may comprise one or more amplifiers, an Analog to Digital Convertor (ADC) and a microcontroller. These components may be used either exclusively for the purposes of readout, or may also be used for other functions such as controlling the heater drive or even controlling other devices within the system. The microcontroller in particular would likely be used for more than one purpose. Other standard system parts & components may also be used. Other circuitry, such as heater drive circuitry and/or a temperature sensor may also be integrated either on the same chip, or on the same package or assembly, or external to the package.

The readout system may be configured to take a reading from the hotwire heater parallel to the direction of flow. Using this reading, it may decide or determine which calibration parameter to use to determine the flow rate. It may also take a reading from the heater perpendicular to the direction of flow, and using the determined calibration parameter then may determine the flow rate of the fluid. The reading from the heater which is parallel to the flow direction (the second heating element) is affected much more by turbulence or change in thermal conductivity of the fluid flowing, which allows determining the calibration parameters based on these effects.

The reading taken may be in many different formats. For example, if the heater parallel to the flow (the second heating element) is driven in a constant resistance or constant temperature method, then the reading would be the power required to keep the heater at the set resistance/temperature. This value can be obtained from the heater drive circuitry. Alternatively, the heater may be driven in a constant current or constant voltage mode, in which case the measured current or voltage may be the heater reading, measured by suitable circuitry comprising a combination of shunt resistor, op-amp, amplifier, analogue to digital controller or other circuits.

Determining the calibration parameter may comprise using the measurement from the first heating element and the second heating element. Alternatively or additionally, additional sensors (the one or more further sensing elements) may be used to determine the calibration parameter or measure the flow rate.

Furthermore, in addition to using the reading from the heater parallel to the flow, the reading from the heater perpendicular to the flow (the first heating element) can also be used, to better determine the calibration parameters. Further, there may also be other sensors within the chip or the system, such as a temperature, pressure, humidity sensor or gas sensor, and the readings from these can also be used. The extra sensors may be integrated within the flow sensor chip, or the same package, or maybe external to the package.

Some or all of the calibration parameters may be determined in manufacture, installation or even during usage by using the flow sensor in one or several flows with a known flow rate. Alternatively, or in addition, it could be calibrated by using a zero flow measurement. Alternatively, the sensor could be calibrated using one or several known differential pressures, and/or a zero differential pressure measurement.

The flow sensor may further comprise a third heating element. The third heating element may intersect the first heating element within or over an area of the dielectric membrane and may intersect the second heating element within or over an area of the dielectric membrane.

The third heating element may intersect the first heating element and the second heating element at a point where the first heating element and the second heating element intersect one another. The third heating element may bisect an angle between the first heating element and the second heating element. The third heating may be arranged at an angle of 60° from the first heating element and at an angle of 60° from the second heating element. Additional numbers of heaters and other angle values are also possible.

The dielectric membrane may comprise at least one recessed region between one of the heating elements and an edge of the dielectric membrane.

The flow sensor may comprise one or more holes within the membrane. The holes could be any shape, such as circular, rectangular, or rectangular with rounded corners. They may be either at the edge of the membrane or near the centre. They may be placed symmetrically or asymmetrically.

An edge of the dielectric membrane may refer to a perimeter edge of the dielectric membrane, in other words, the area where the dielectric membrane meets or joins the semiconductor substrate. The area of the dielectric layer or region above the semiconductor substrate may refer to the area of the dielectric layer outside the dielectric membrane.

The at least one recessed region may comprise one or more discontinuous regions where the thickness of the dielectric membrane is discontinuous or varies from an average or most common dielectric membrane thickness. The recessed regions or discontinuities in the dielectric membrane provide an interruption in the thermal conduction path through the solid of the dielectric membrane. In use, these discontinuities contain gas from the fluid flow, and this can be measured by the change in the thermal conduction through the device.

The at least one recessed region may comprises one or more holes. The holes may refer to apertures, perforations or slots extending through an entire height or depth or thickness of the dielectric membrane. This provides fluid connection between an area above and an area below the membrane.

The at least one of the one or more holes may comprise an elongate slot extending towards opposite edges of the dielectric membrane. The elongate slot may not extend completely to the edges of the dielectric membrane. This increases thermal isolation across a width of the dielectric membrane of the device. Optionally the elongate slot may be extending in a same direction as one or more heating elements and/or sensing elements. The elongate slots may be, for example, rectangular, square, or semicircle.

The one or more holes may comprise an array of perforations. The perforations may comprise individual holes significantly smaller than a width of the dielectric membrane of the device. The array of perforations may can extend substantially across a width of the device.

The at least one recessed region may comprise a partial recess within the dielectric membrane. The partial recess or trench may extend from a top surface of the dielectric membrane or may extend from a bottom surface of the dielectric membrane. The partial recess may extend partially through a height or depth or thickness of the dielectric membrane.

The at least one recessed region may be arranged to be symmetrical about axes defined by the first heating element and the second heating element. The holes or discontinuities within the dielectric membrane may be symmetric about the first heating element and the second heating element. Alternatively, the holes may be symmetric about one of the first heating element or the second heating element.

The at least one recessed region may be arranged to be asymmetrical about an axis defined by the first heating element. In other words, the holes within the membrane may be placed asymmetrically. In use, with no flow or static flow, this allows sensing of different components of a fluid using a differential signal between two sensing elements.

The flow sensor may further comprise one or more further sensing elements. The further sensing elements may be within or on the dielectric membrane or alternatively, can be outside the dielectric membrane. There may be one further sensor element or there could be more than one further sensing element. The one or more further sensing elements may measure a parameter in conjunction with heating element operating as a sensing element.

The one or more further sensing elements may comprise one or more temperature sensors, pressure sensors, humidity sensor and/or gas sensors. The one or more further sensing elements may comprise a combination of temperature sensors, pressure sensors, humidity sensor and/or gas sensors.

Besides the two hotwire heaters or heating elements, there may also be other components within or on the membrane. These may be additional hotwire temperature sensors, or thermopiles may be used. Furthermore, piezo-resistors may also be on the membrane to measure changes in pressure. Additionally, the membrane can also have electrodes and a gas sensitive material, and therefore be used for resistive or capacitive gas sensing.

The further sensors or sensing elements may be embedded either within the same chip as the flow sensor, or within the same package as the flow sensor.

Readings from the further sensors may also be used to determine the calibration parameters along with the readings from the second heater.

The one or more further sensing elements may comprise at least a pair of sensing elements located on opposing sides of the first heating element or the second heating element. The at least a pair of sensing elements may comprise an odd number of sensing elements or may comprise a plurality of pairs of sensing elements. One or more further sensing elements may be laterally spaced from the heating element and located on a first side of the heating element and one or more further sensing elements may be laterally spaced from the heating element and located on a second side of the heating element, wherein the first side and the second side are opposite sides of the heating element.

The pair of sensing elements may comprise a pair of temperature sensing elements or heating elements extending in a direction perpendicular to the direction of flow through the sensor. The pair of sensing elements may be substantially perpendicular or within 10 degrees° of perpendicular to the direction of flow through the sensor. The pair of sensing elements may intersect with the second heating element only and may not intersect the first heating element. In other words, the sensing elements may be substantially parallel to the first heating element.

There may be additional hotwires in the direction perpendicular to the fluid flow. For example, two additional hotwires may act as resistive temperature sensors before and after the hotwire heater, in this way allowing a calorimetric measurement. There may be two additional hotwires within the membrane in a direction perpendicular to the direction of flow. The two additional hotwires may be used as either heaters or resistive temperature sensors.

Alternatively or additionally, there may be two thermopiles within the membrane in a direction perpendicular to the direction of flow.

One of the first or second further sensing elements may be located upstream of the flow from the heating element and the other of the first or second further sensing elements may be located downstream of the flow from the heating element. This allows properties, variables, or parameters of a flow to be measured.

The dielectric membrane may comprise at least one recessed region located between one of the heating elements and at least one of the one or more further sensing elements.

The at least one recessed region may be located between a first further sensing element of the at least a pair of sensing elements and the heating element and at least one other recessed region may be located between a second further sensing element of the at least a pair of sensing elements and an edge of membrane. This thermally isolates the first further sensing element from the heating element and thermally isolates the second further sensing element from the semiconductor substrate around the edge of the membrane. Therefore, the thermal differential between the first further sensing element and the second further sensing element is more sensitive to a change in gas concentration and composition. This asymmetric arrangement of discontinuities can sense different components of a fluid using a differential signal between the two sensing elements, even when used with no flow or static flow.

At least one of the one or more further sensing elements may be configured to measure a temperature difference across one of the heating elements. For example, they may be used to measure a change in temperature across the heating element.

At least one of the one or more further sensing elements may be configured to measure a temperature difference between the dielectric membrane and the dielectric region above the semiconductor substrate.

The one or more further sensing elements may comprise resistive temperature detectors, diodes, or thermopiles. The etched portion of the semiconductor substrate may extend partially through the thickness of the semiconductor substrate. This has a suspended membrane structure which has a lower power consumption. The cavity within the substrate may extend all the way through the substrate (typically formed by back side etching), or maybe only within part of the substrate (typically formed by front side etching). The cavity may have vertical side walls formed by Deep Reactive Ion Etching (DRIE) or may have sloping sidewalls formed by Potassium Hydroxide (KOH) or Tetramethylammonium hydroxide (TMAH) etching.

The sensor may further comprise an application specific integrated circuit (ASIC) coupled to the sensor. The ASIC may be located underneath the sensor, for example using a die stack technique. Alternatively, the ASIC may be located elsewhere. The ASIC may be connected to the sensor using wire bonding and pads, or using through-silicon-vias extending through the semiconductor substrate.

The fluid flowing through the flow sensor may be a liquid or a gas. In case of a liquid, the flow sensor chip may have a protective coating to protect against corrosion, and to be biocompatible. A protective coating may also be used in the case of a gas if the gas flowing is particularly corrosive.

According to a further aspect of the present disclosure, there is provided a flow sensor assembly comprising: a flow sensor housing; and a flow sensor as described above located within the flow sensor housing. The flow sensor housing may comprise an inlet and an outlet and a fluid flow path for directing a fluid flow through the sensor. The flow sensor housing may include a second (base) substrate and a lid formed over the base substrate and the flow sensor.

The flow sensor assembly may further comprise integrated circuitry connected to the flow sensor. The integrated circuitry may be formed on the same chip as the flow sensor, may be located under the sensor, adjacent to the sensor, and/or in the same package as the flow sensor.

According to a further aspect of the present disclosure, there is provided a method of manufacturing a flow sensor, the method comprising: forming at least one dielectric membrane on a semiconductor substrate comprising an etched portion, wherein the dielectric membrane is over an area of the etched portion of the semiconductor substrate; forming a first heater on or within the dielectric membrane; forming a second heater on or within the dielectric membrane, wherein the first heater and the second heater are arranged to intersect one another within or over an area of the dielectric membrane; and forming a controller coupled with the first heating element and the second heating element, and wherein the controller is configured to: take a measurement from the second heating element; determine a calibration parameter using the measurement from the second heating element; take a measurement from the first heating element; and determine a flow rate through the flow sensor using the determined calibration parameter and the measurement from the first heating element.

There is also described a method of operating a flow sensor as described above, the method comprising taking a measurement from a second heating element; determining a calibration parameter using the measurement from the second heating element; taking a measurement from a first heating element; and determining a flow rate through the flow sensor using the determined calibration parameter and the measurement from the first heating element.

BRIEF DESCRIPTION OF THE FIGURES

Some embodiments of the disclosure will now be described by way of example only and with reference to the accompanying drawings in which.

DETAILED DESCRIPTION OF THE PREFERRED EMBODIMENTS

Figure 1:
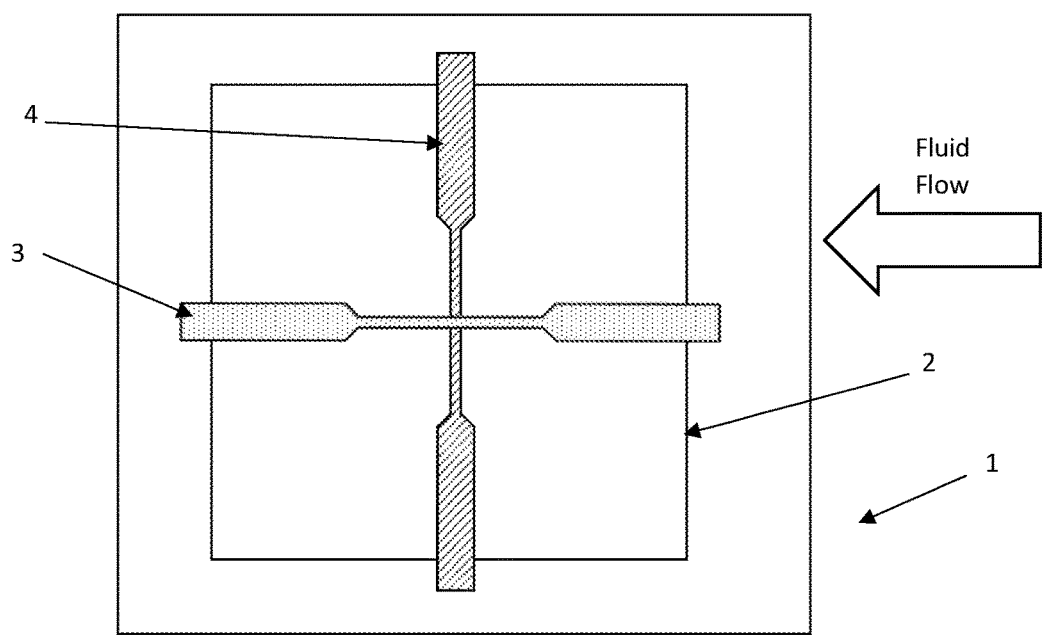
FIG. 1 shows a schematic top view of a flow sensor chip with perpendicular hotwires according to an embodiment of the disclosure.

FIG. 1 shows a top view of a flow sensor chip or flow sensor 1 with perpendicular resistive hotwires, according to an embodiment of the disclosure. The chip has a rectangular membrane 2. Within the membrane there is a hotwire 3 which is parallel to the direction of fluid flow, and a hotwire 4 which is perpendicular to the direction of fluid flow.

The hotwires in the figure are shown as wide tracks which narrow in the centre. However, they can also be of a uniform width throughout, or a tapered width, or any other shape. The membrane can be rectangular, circular, or rectangular with rounded corners.

The two heaters 4 and 3 could be operated in pulse mode at different times. The heater 4 could be operated to sense the flow parameters, such as flow rate, velocity, mass or volume flow rates, by measuring its resistance in the presence of flow (or by monitoring the temperature/power of a sensing element or the differential signal of a pair of sensing elements—not shown) and the second heater 3 could be used to enable the detection of different fluid components (flow composition). The first heater 4, which contains a hot wire, has a direction that is orthogonal to the direction of the flow to enhance the sensitivity to flow rate/velocity, while the second heater is aligned to the flow direction to be less affected by the flow rate/velocity and instead measure the composition of the fluid. The two heaters may be made of different metal layers (e.g. Aluminium, Tungsten, Copper, Titanium, Platinum etc.) available in the fabrication process (e.g. CMOS process).

Figure 2:
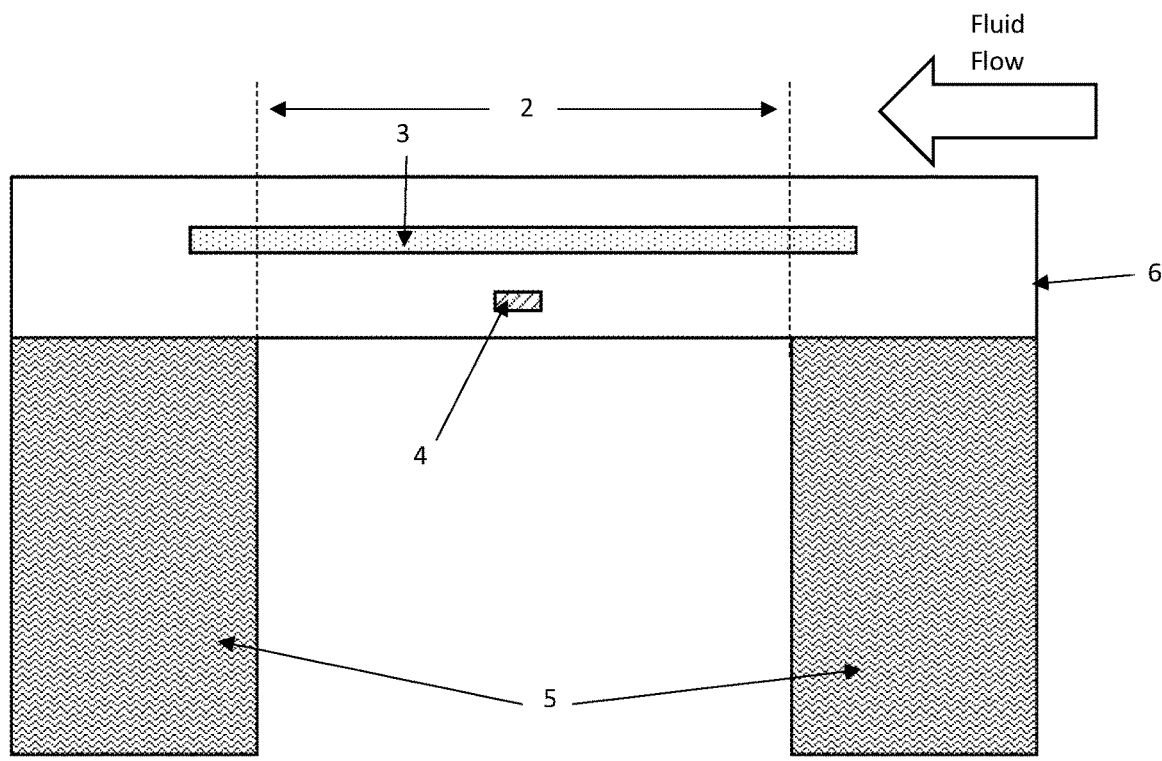
FIG. 2 shows a schematic cross-section of the flow sensor chip of FIG. 1, according to an embodiment of the disclosure.

FIG. 2 shows a cross-section view of the flow sensor chip of FIG. 1. The flow sensor chip 1 includes a semiconductor substrate 5 with a cavity or etched portion, and a dielectric layer 6, and the region of the dielectric layer 6 adjacent to the substrate cavity is referred to as the dielectric membrane 2. Within the membrane there is a hotwire (or second heating element) 3 which is parallel to the direction of fluid flow, and a hotwire (or first heating element) 4 which is perpendicular to the direction of fluid flow.

The substrate 1 could normally be made of silicon, but can also be germanium, silicon carbide, gallium nitride or gallium arsenide, or any other semiconductor. The dielectric layer 6 may comprise one or more layers of silicon oxide and silicon nitride. It may also include other types of dielectric such as aluminium oxide.

The hotwire 4 is shown as below hotwire 3, but it can also be above. The hotwires can include any material, for example a CMOS resistive material such as aluminium, polysilicon, single crystal silicon, tungsten, or titanium. It can also be a non-CMOS metal such as platinum or gold. The hotwires could also be made of a diode or a transistor, with a very long channel length or width.

Figure 3:
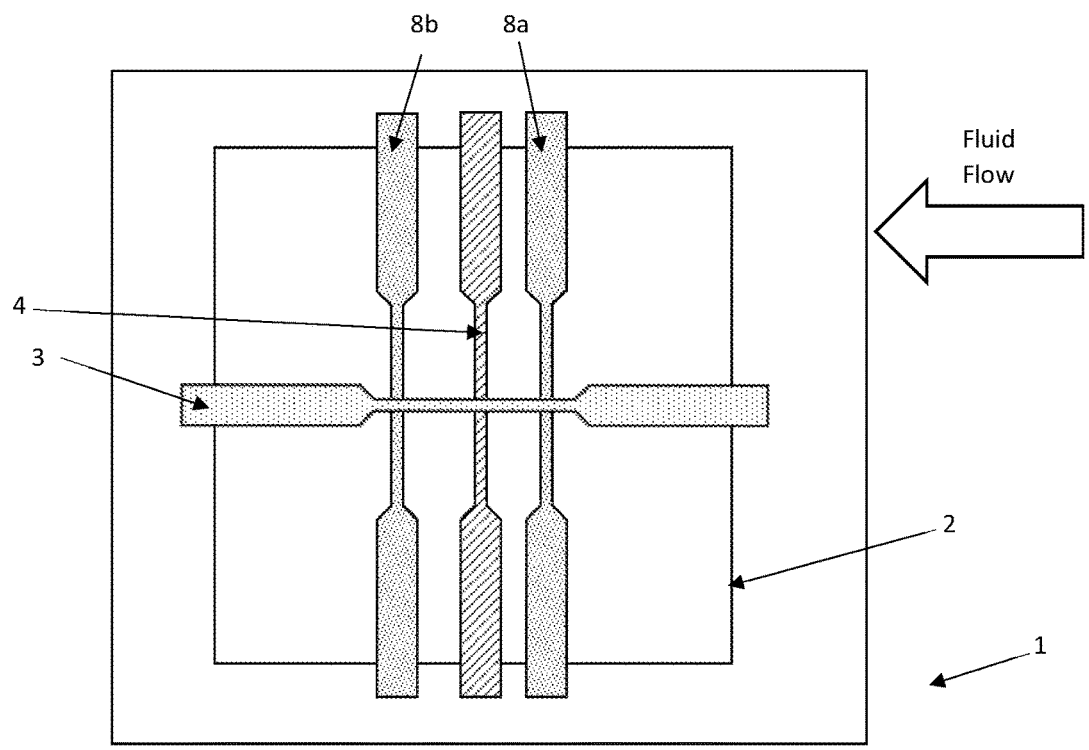
FIG. 3 shows a schematic top view of a flow sensor chip with three resistors in the direction perpendicular to the flow according to an embodiment of the disclosure.

FIG. 3 shows a top view of a flow sensor die or chip 1, with two additional hotwires 8a, 8b perpendicular to the flow direction, according to an embodiment of the disclosure. In this embodiment, there are three resistors 4, 8a, 8b in the direction perpendicular to the direction of flow through the flow sensor. A pair of additional sensing elements 8a, 8b are located on opposing sides of the first heating element 4. One of the hotwires 8a is upstream from the heater, and the other 8b is downstream. These could be used as resistive temperature sensors, and the difference in temperature is used to determine the flow rate, allowing use as a calorimetric flow sensor.

Figure 4:
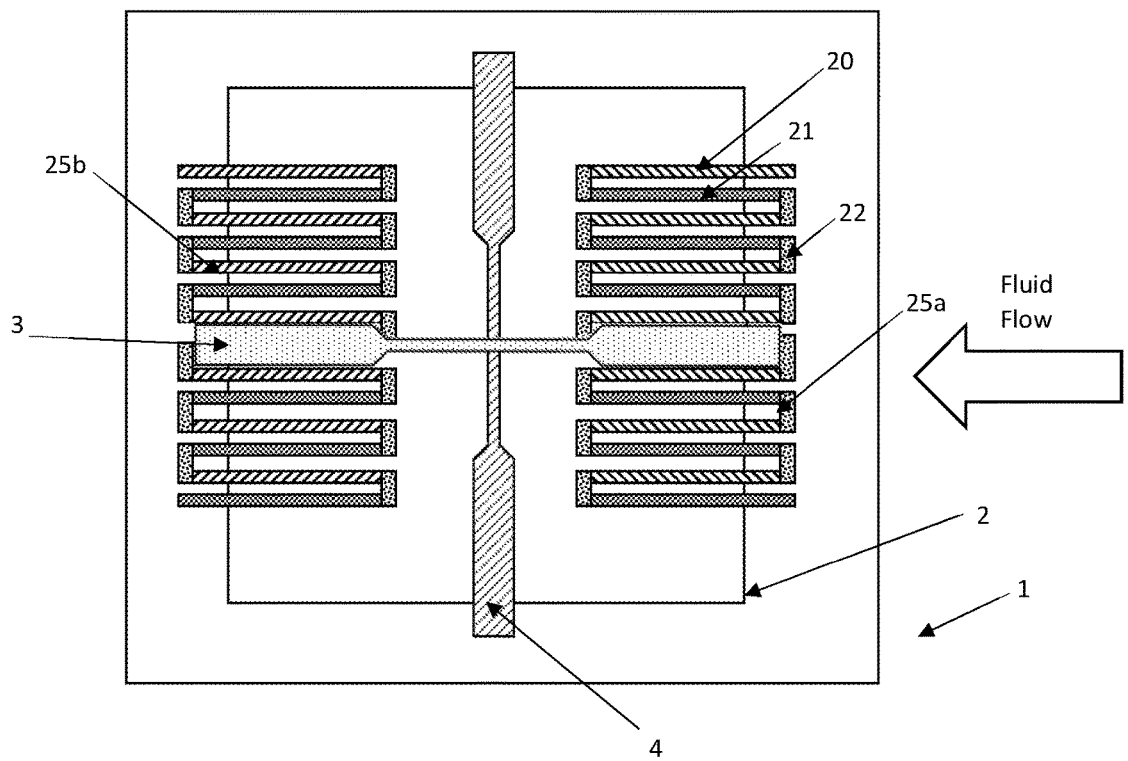
FIG. 4 shows a schematic top view of a flow sensor chip two thermopiles, according to an embodiment of the disclosure.

FIG. 4 shows a schematic top view of a flow sensor chip where there are also two thermopiles 25a, 25b present in the direction perpendicular to the flow, according to an embodiment of the disclosure. One thermopile 25a is upstream from the heater, and the other thermopile 25b is downstream. The thermopiles 25a, 25b each include a series of thermocouples. Each thermocouple includes strips of two different materials 20, 21. A junction 22 is formed between the material strips. The junction 22 can be a material different to 20 and 21, or maybe the same as either 20 or 21. The materials for the thermocouples could be p-doped or n-doped polysilicon, p-doped or n-doped single crystal silicon, or a metal such as aluminium, titanium, tungsten or copper.

The thermopiles are relative temperature sensors that can sense a difference in temperatures between a hot junction and a cold junction and translate them into voltage changes without the need of any external power supply. The hot junctions of the thermopiles 25a, 25b are placed on the dielectric membrane, while the cold junctions are placed outside the membrane above the semiconductor substrate. The thermopiles therefore each measure a temperature difference between the dielectric membrane and the dielectric region above the semiconductor substrate. The temperature difference across the heater 4 can therefore be calculated using readings from both thermopiles 25a, 25b.

Such a device may have the first heater 4 driven in a constant temperature mode, and the differences in the temperatures between the two thermopiles 25a, 25b provides the reading used to determine the flow rate (along with the calibration parameters determined by the reading from the second heater 3).

Figure 8:
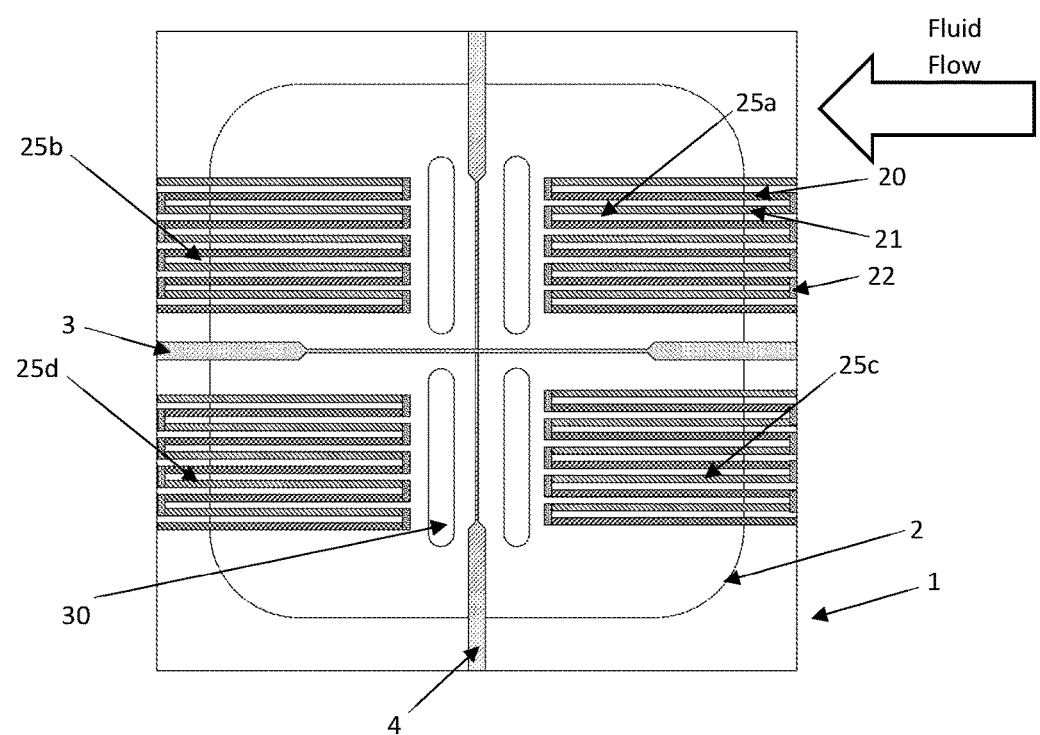
FIG. 8 shows a schematic top view of a flow sensor with four thermopiles and four holes arranged symmetrically about the heating element, according to an embodiment of the disclosure.

To minimise the effect of different cold junction temperatures, the cold junctions of the thermopiles shown in FIGS. 4 and 8 can be electrically or thermally connected together through metallization outside on the membrane or on the edge of the membrane. The cold junctions of all these thermopiles could be connected to ground and used as a reference potential.

Figure 5:
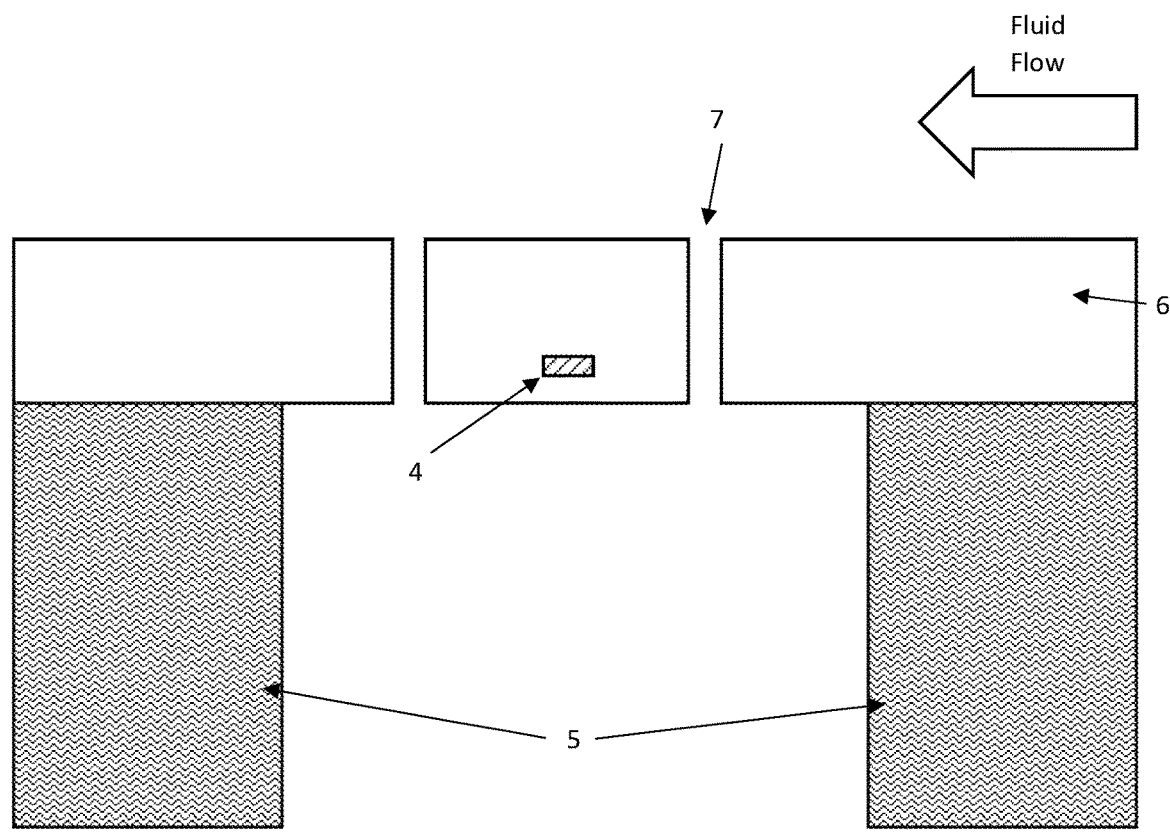
FIG. 5 shows a schematic cross-section of a flow sensor chip with holes through the dielectric membrane, according to an embodiment of the disclosure.

FIG. 5 shows a cross-section of a flow sensor chip with holes or recessed regions 7 within the dielectric membrane, according to an embodiment of the disclosure. The holes 7 can be circular, or rectangular, or rectangular with rounded corners, or other arbitrary shapes. They may be just small rounded holes at the edge of the die 1, or maybe larger holes extending towards the hotwire 3, 4. Many designs and shapes are possible. FIG. 5 shows a cross section of the device of FIG. 6, across the cut-line A-A'.

Figure 6:
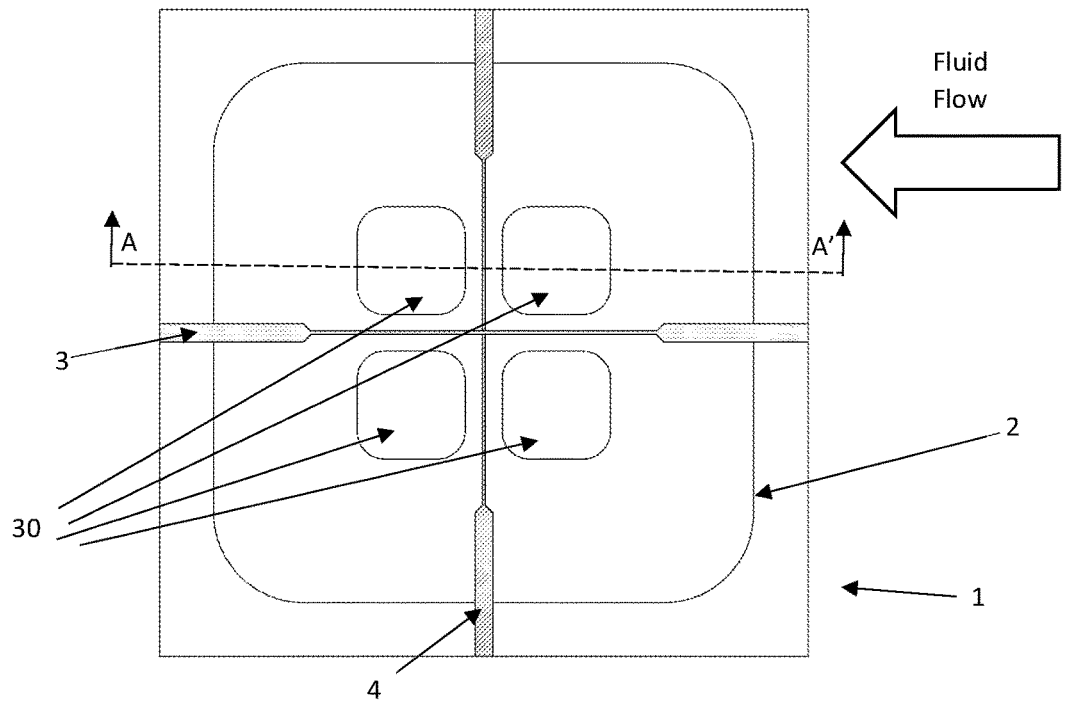
FIG. 6 shows a schematic top view of a flow sensor chip with holes arranged symmetrically about the heating elements, according to an embodiment of the disclosure.

FIG. 6 shows a top view of a flow sensor chip with holes 30 arranged symmetrically within the dielectric membrane 2, according to an embodiment of the disclosure. In this case the membrane is rectangular with rounded corners. There are four holes near the centre and these are also rectangular with rounded corners. The holes are placed symmetrically around both the hotwires 3 and 4.

Figure 7:
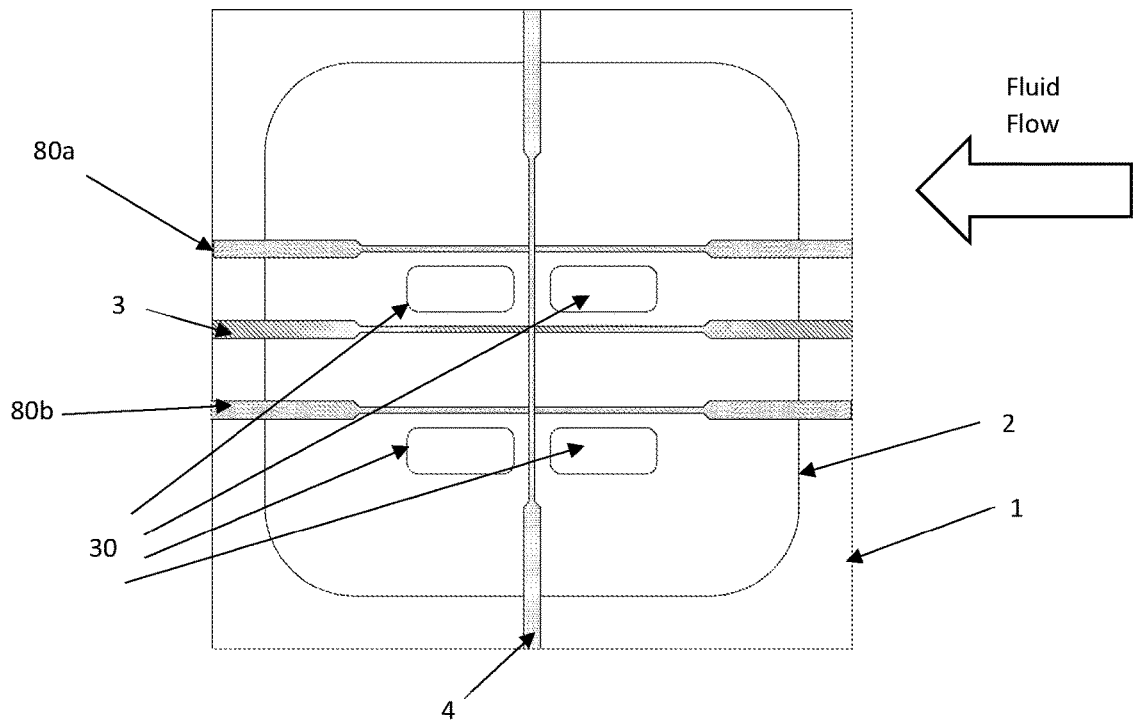
FIG. 7 shows a schematic top view of a flow sensor chip with holes arranged asymmetrically about the heating elements, according to an embodiment of the disclosure.

FIG. 7 shows a top view of a flow sensor chip with an alternate arrangement of holes 30 within the dielectric membrane 2, with the holes 30 arranged asymmetrically about the first heating element 4 according to an embodiment of the disclosure. Further the membrane also has additional hotwires 8a, 8b which can be used as either a heater or, more typically, as temperature sensors.

FIG. 7 also shows a two heater arrangement with similar features to that described in the embodiment shown in FIG. 6. The heating elements 80a, 80b in this embodiment are parallel to the direction of flow and to the second heating element 3. This time an asymmetrical design is proposed to enhance the sensitivity to detection of the fluid components. When heater 4 is operated, 80b will be hotter than 80a and the temperature difference between 80a and 80b will be proportional to the gas ($CO_2$) concentration. Given that the heater 4 and the sensing elements 80a and 80b are aligned to the flow, the temperature difference between 8a and 8b due to the flow rate will be less significant than in the case where these structures heater 4, sensing elements 80a and 80b would have been placed perpendicular to the flow direction. In this respect this particular design offers high sensitivity to the flow composition and is able to discriminate more effectively between changes in temperature due to flow or concentration of fluid components that have different thermal conductivities.

In alternative embodiments, the heating elements can be perpendicular to the direction of flow and to the second heating element 3.

FIGS. 6 and 7 show two example arrangements of holes, but many different arrangements and different shapes of holes are possible.

FIG. 8 shows a schematic top view of a flow sensor with four thermopiles and four hole, according to an embodiment of the disclosure. In this embodiment there are four holes, and four thermopiles 25a, 25b, 25c, 25d, in addition to the two heaters. The thermopiles are configured in the direction perpendicular to the flow, and signals from all four thermopiles may be used to determine the flow. The combination of thermopiles may also be used to provide information about other properties of the fluid such as thermal conductivity, density and/or specific heat capacity. Using differential and sum signals between different sets of thermopiles it is possible to differentiate between flow properties such as flow rate or velocity and composition of the flow based on thermal conductivity differences between different components of the flow.

Other designs to this arrangement are possible. For example, one or two holes from those in FIG. 8 may be missing. In this case the measured values from the thermopiles may be enhanced by changes in fluid property allowing measurement of such properties.

Figure 9:
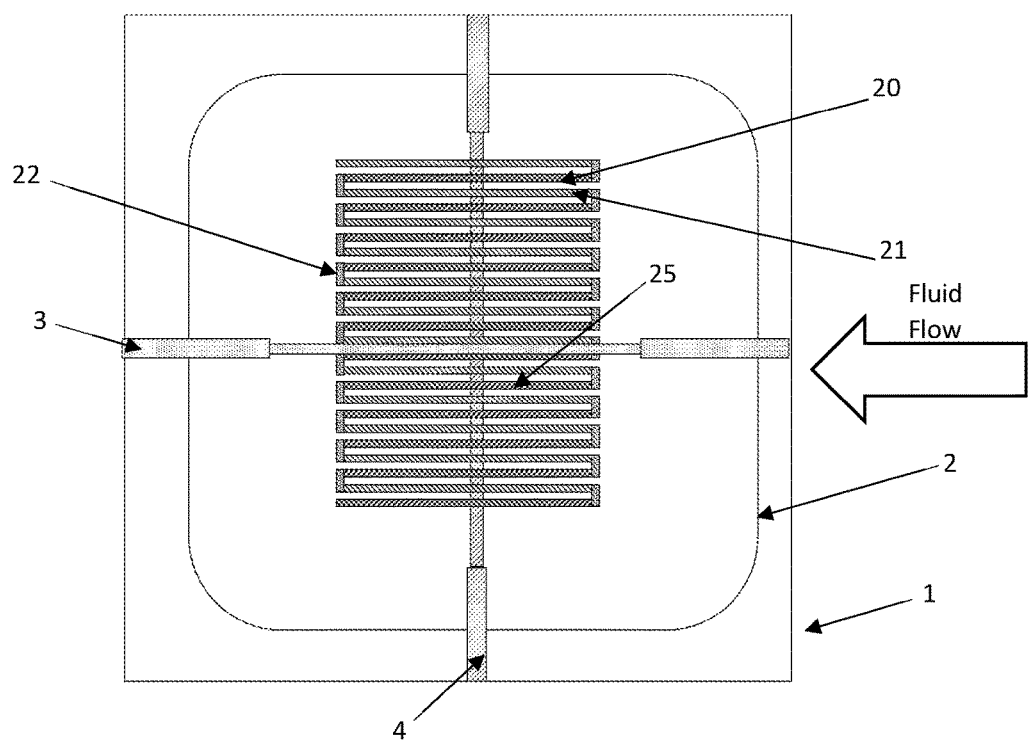
FIG. 9 shows a schematic top view of a flow sensor chip with one thermopile across the first heating element, according to an embodiment of the disclosure.

FIG. 9 shows a schematic top view of a flow sensor chip where there is only one thermopile 25 across the first heating element 4, in a direction perpendicular to flow, according to an embodiment of the disclosure. Unlike the previous designs, in this case both the hot and cold junctions are on the membrane, and placed at equal distance from the heater. The hot junction is downstream from the heater, and the cold junction is upstream from the heater, and in this way allows a calorimetric measurement of the flow.

The two heaters are not connected physically or electrically and can be for example made of different metal layers. A thermopile 25 (also made in different layers than the heaters 3 and 4) can be placed symmetrically around or across both the heaters. The hot junction can be placed on one side of the first heater 4 and the cold junction on the other side of the first heater 4, both within the membrane at a certain distance from the heater and the edge of the membrane. The heaters could be operated in pulse mode at different times. The first heater 4, perpendicular to the direction of the flow could be operated to sense the flow properties, such as flow rate, velocity, mass or volume flow rates, by measuring the voltage drop of the thermopile, while the second heater 3, aligned to the flow could be operated to sense the flow composition by measuring the voltage drop of the thermopile, when the heater 4 is off. Both the first 4 and/or the second heater 3 could be modulated in temperature to increase the accuracy of the measurements and improve sensitivity/selectivity to different components of the flow.

Figure 10:
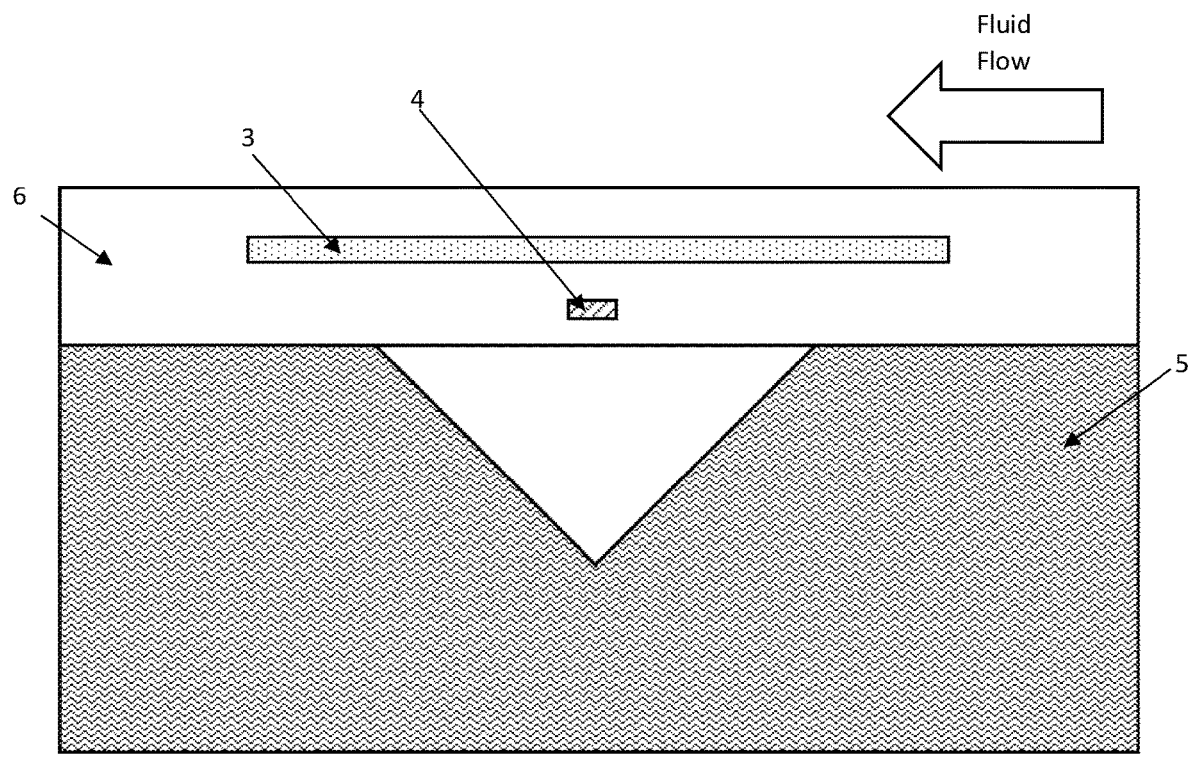
FIG. 10 shows a schematic cross-section of a flow sensor chip in which the substrate cavity does not extend throughout the entire substrate, according to an embodiment of the disclosure.

FIG. 10 shows a cross-section of a flow sensor chip where the semiconductor substrate has a cavity or etched portion that does not extend through the entire substrate 5, according to an embodiment of the disclosure. Such a cavity may be formed for example by a front side etching of the substrate, using either KOH or TMAH. This suspended membrane structure has reduced power consumption.

Figure 11:
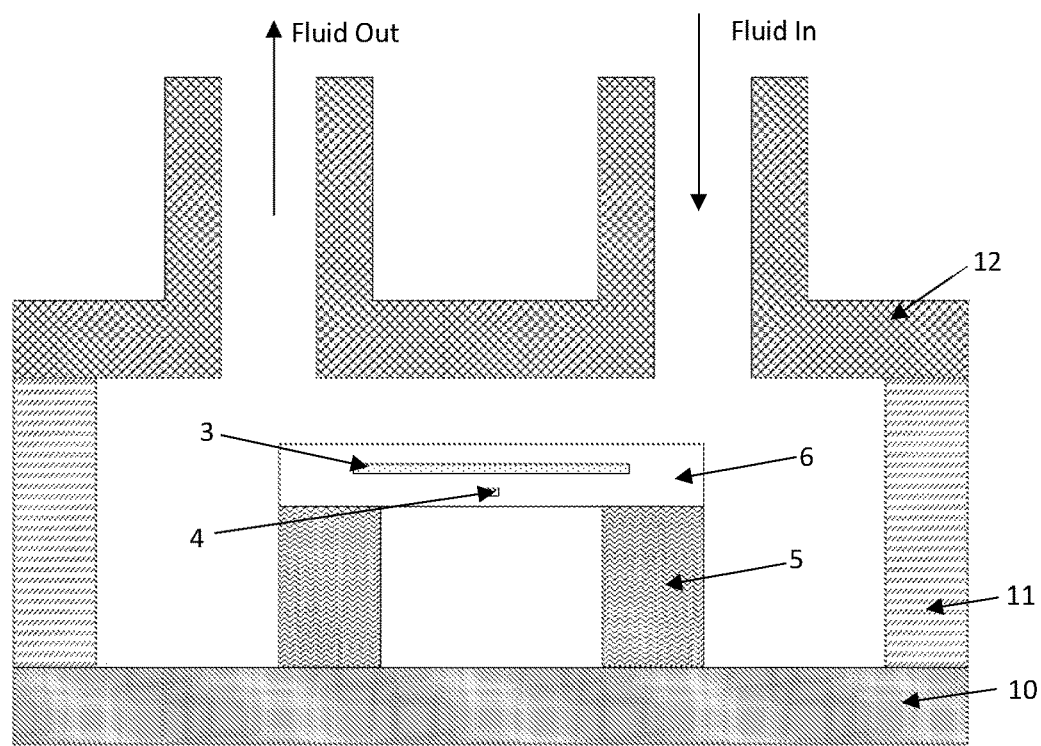
FIG. 11 shows a schematic cross-section of a packaged flow sensor chip according to an embodiment of the disclosure.

FIG. 11 shows a cross-section of a flow sensor chip in a package, according to an embodiment of the disclosure. The package includes a base substrate 10, sidewalls 11 and a lid 12. The lid has inlets and outlets to allow connection to the fluid.

Figure 12:
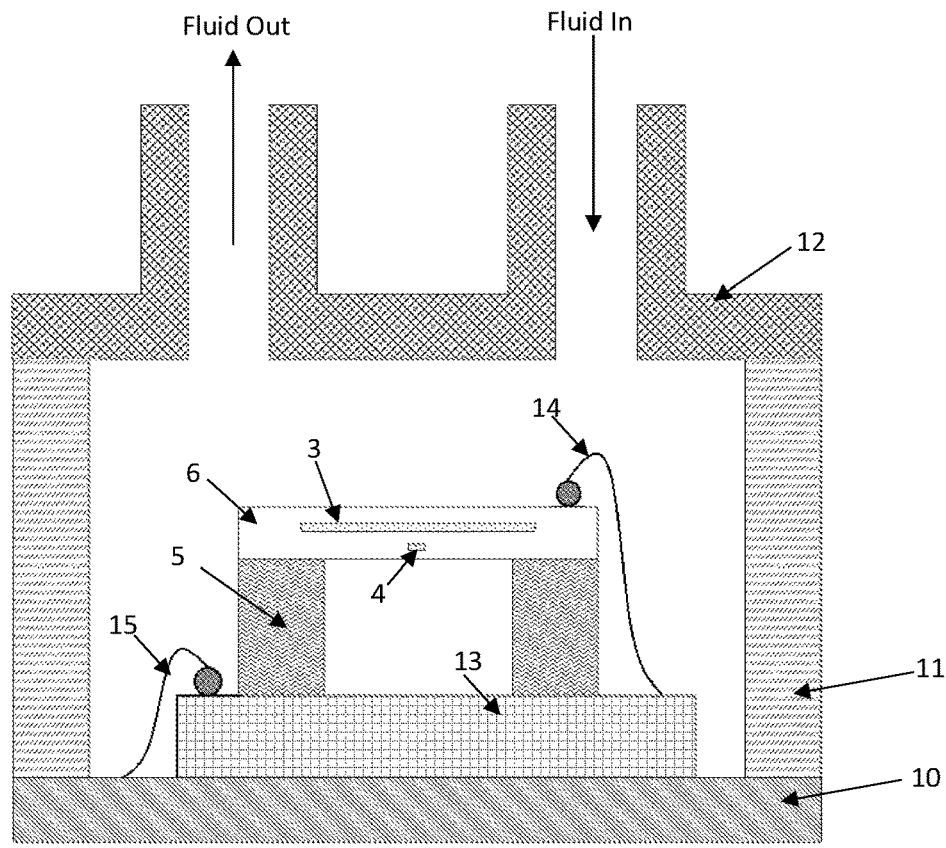
FIG. 12 shows a schematic cross-section of the flow sensor chip packaged with an integrated circuit chip according to an embodiment of the disclosure.

FIG. 12 shows a cross-section of a flow sensor chip packaged together with a circuit chip, according to an embodiment of the disclosure. The circuit chip 13 is attached to the package base 10. The flow sensor chip is attached to the circuit chip 13. Bond wires 14 provide electrical connection from the flow sensor chip to the circuit chip, while bond wires 15 provide electrical connection from the circuit chip to the package.

It should be noted that besides the package concept shown in FIGS. 9 and 10, many other concepts are also possible, such as lateral flow connections and chip scale packages.

Figure 13:
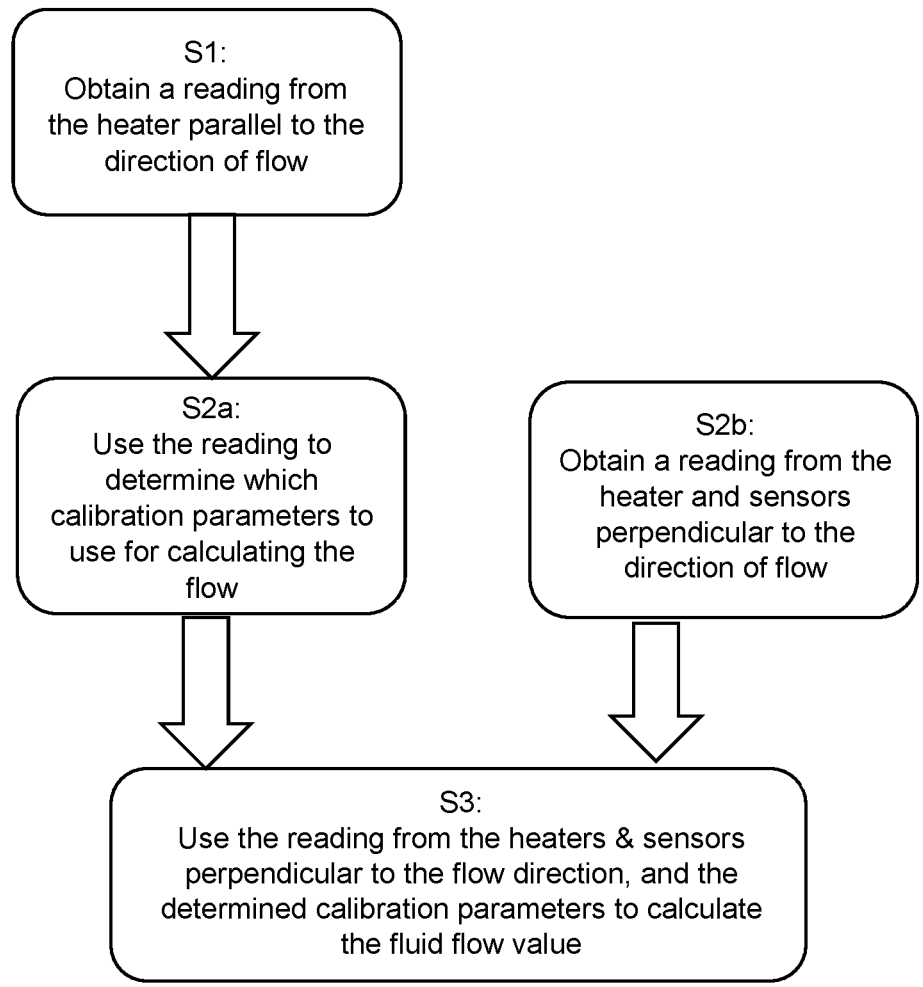
FIG. 13 shows a flow diagram illustrating data processing steps within the readout system of the flow sensor, according to an embodiment of the disclosure.

FIG. 13 shows a flow diagram to illustrate data processing steps within the readout system or controller, according to an embodiment of the disclosure. In step S1, a reading is obtained from the heater parallel to the direction of flow. In step S2a, this reading is used to determine which calibration parameters to use for calculating the flow. In step S2b, a reading is also obtained from the heater perpendicular to the direction of flow, and in step S3 this reading is used, along with the determined calibration parameters to calculate the fluid flow value.

The reading used can be the heater power, temperature, resistance, current or voltage. The exact parameter used would depend on the heater drive method. It is also possible that more than one reading from each heater is used.

Figure 14:
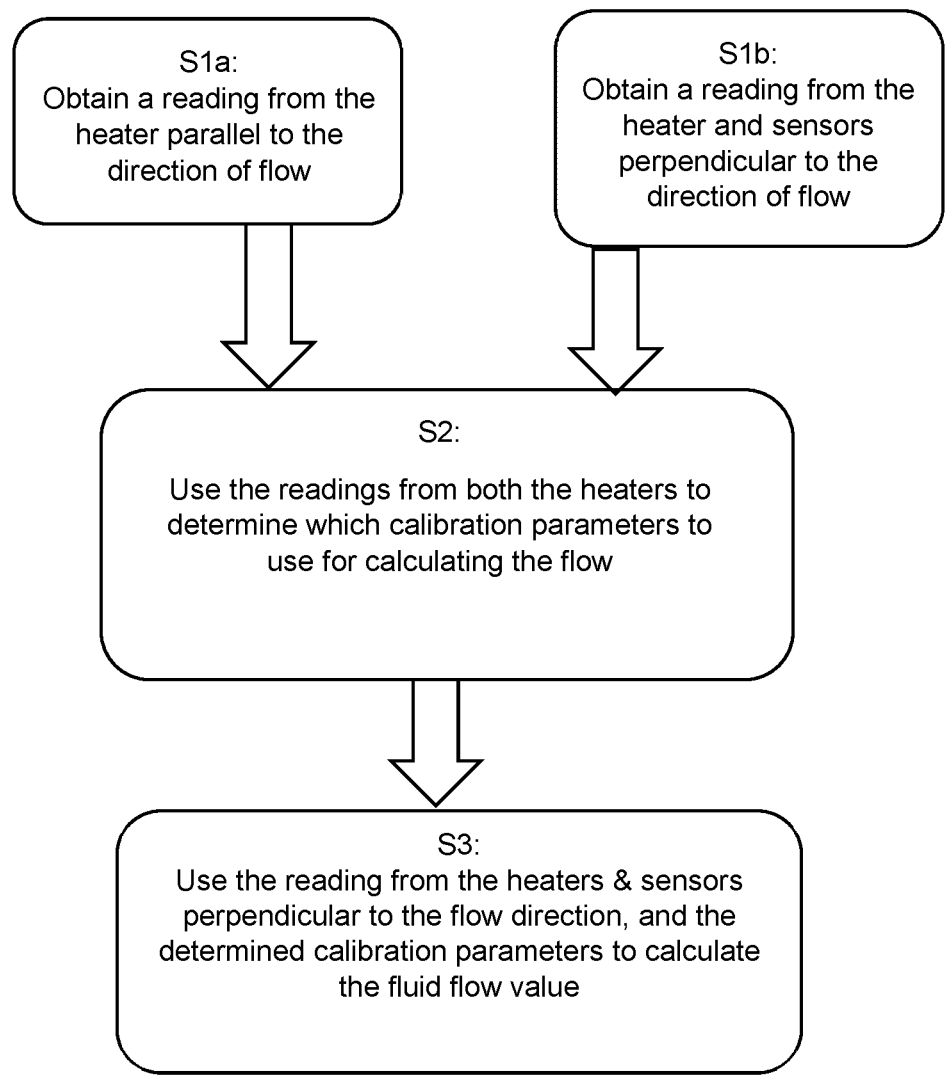
FIG. 14 shows a flow diagram illustrating an alternate set of data processing steps within the readout system of the flow sensor, according to an embodiment of the disclosure.

FIG. 14 shows an alternate flow diagram of data processing steps within the readout system, according to an embodiment of the disclosure. In this method, in step S2 the calibration parameters are determined using readings from both the heaters (parallel and perpendicular to the fluid flow). In step S3, the calibration parameters are then combined with the reading from the perpendicular heater to determine the rate of fluid flow.

It should be noted that besides this, other data may also be used to determine the fluid flow. For example using the data from other sensors either integrated within the chip, or within the same package or external to the package.

Figure 15:
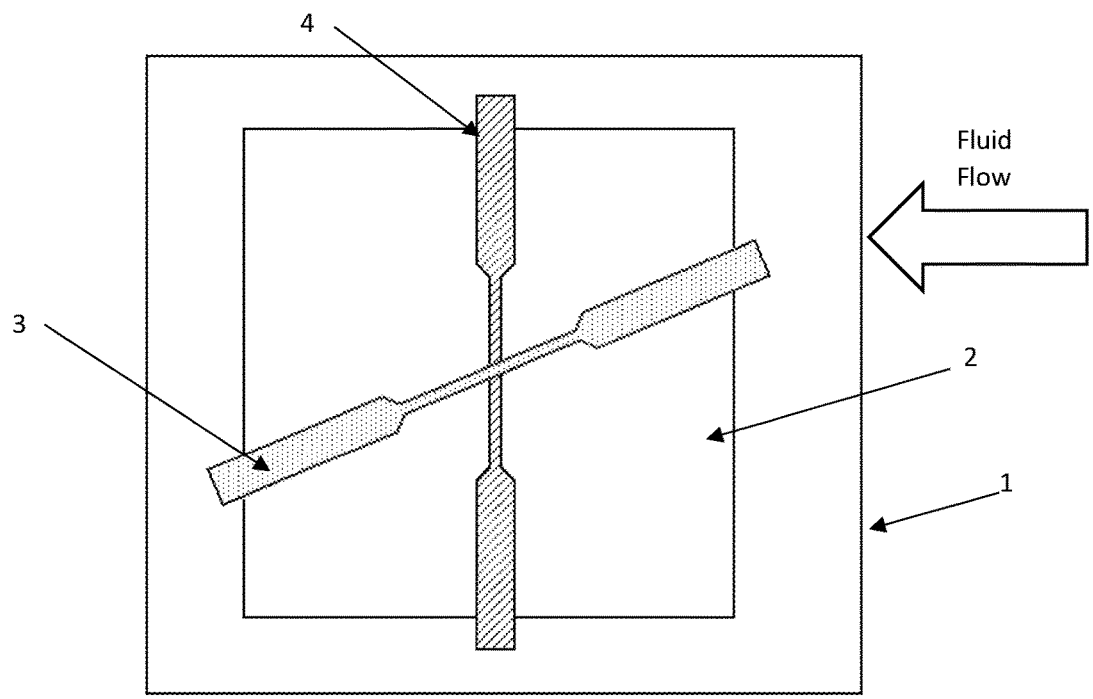
FIG. 15 shows a top view of a flow sensor where the heaters are at an acute angle to each other, according to an embodiment of the disclosure.

FIG. 15 shows a top view of a flow sensor chip 1 where the second heater 3 is not parallel to the direction of fluid flow, rather it is at a different angle to the first heater 4 and the direction of flow, according to an embodiment of the disclosure. In such a configuration, the second heater 3 can still be used to determine which calibration parameters to use.

Figure 16:
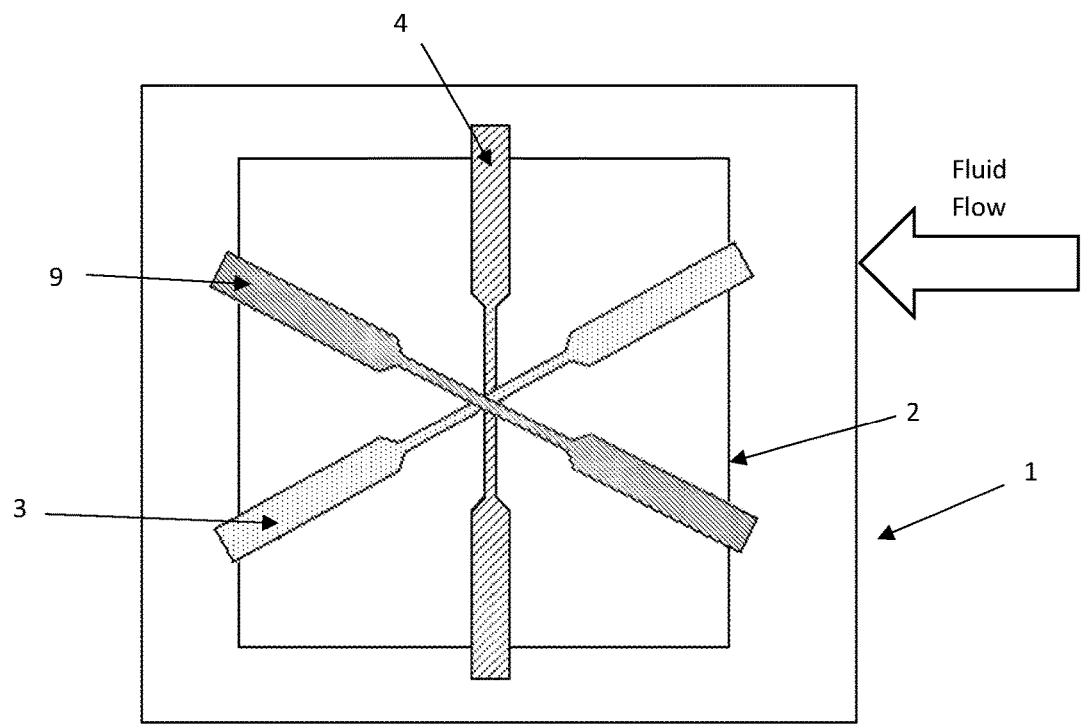
FIG. 16 shows a top view of a flow sensor where there are three heaters according to an embodiment of the disclosure.

FIG. 16 shows the top view of a flow sensor chip where there are three heaters, a heater 4 that is perpendicular to the direction of flow, and two heaters 3 and 9 which are both at an angle of 60° to the first heater 4, according to an embodiment of the disclosure. In such a configuration one or both of 3 and 9 may be used to determine which calibration parameters to use.

Figure 17:
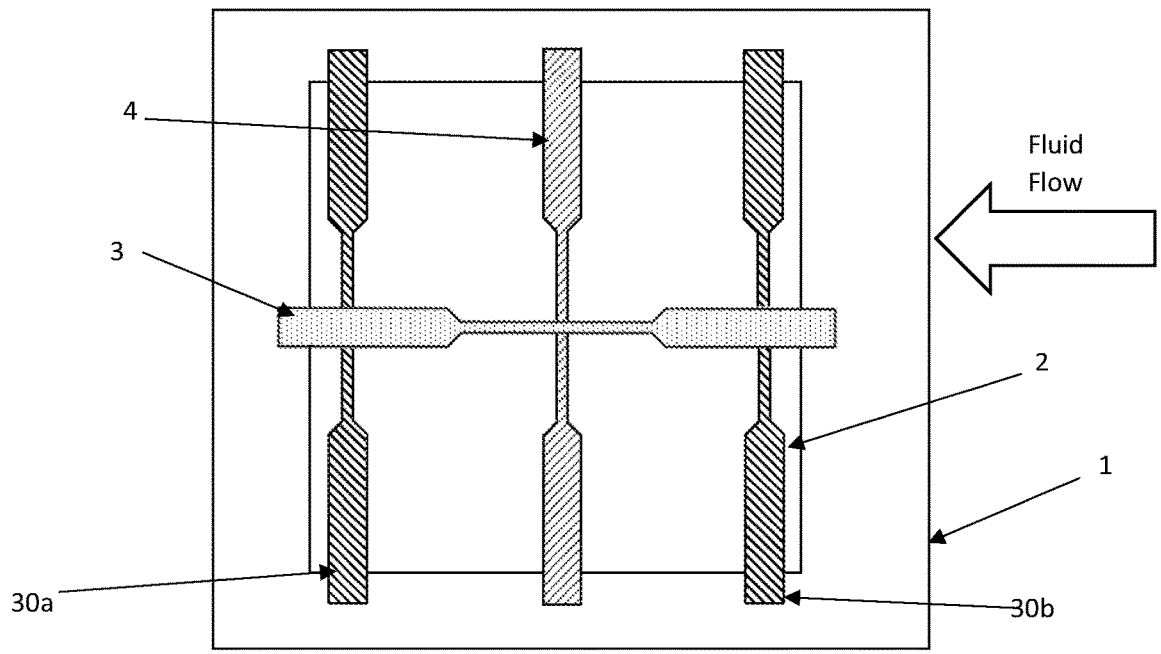
FIG. 17 shows the top view of a flow sensor where there are 2 additional heaters on either side of one of the heaters, and the additional heaters are perpendicular to the direction of flow.

FIG. 17 shows the top view of a flow sensor chip with a heater 4 perpendicular to the direction of flow, and a further heater 3 perpendicular to the first heater 4, and two additional heaters 30a and 30b parallel to the first heater 4 and on each side of the heater 4. In this embodiment, these additional heaters 30a, 30b are close to the edge of the membrane 2, but they can also be close to the central heater 4. The additional heaters 30a, 30b can be used to maintain a constant temperature at the location of the heaters 30a, 30b, so that power required by the central heater 4 when running in constant temperature mode is unaffected by changes in ambient temperature. This improves the sensitivity of the heater when measuring the flow rate or pressure differential across the sensor.

Figure 18:
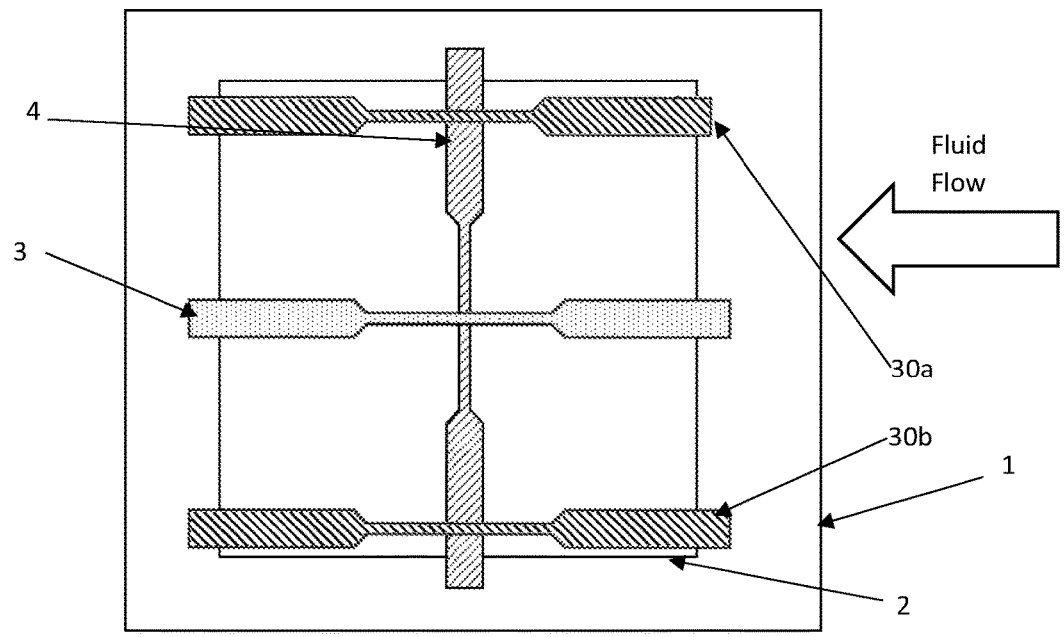
FIG. 18 shows the top view of a flow sensor where there are 2 additional heaters on the either side of one of the heaters, and the additional heaters are parallel to the direction of flow.

FIG. 18 shows the top view of a flow sensor chip with a heater 4 perpendicular to the direction of flow, and a further heater 3 perpendicular to the first heater 4, and two additional heaters 30a and 30b parallel to the heater 3 and on each side of the heater 3. In this embodiment, these additional heaters 30a, 30b are close to the edge of the membrane 2, but they can also be close to the central heater 4. The additional heaters 30a, 30b can be used to maintain a constant temperature at the location of the heaters 30a, 30b, so that power required by the central heater 4 when running in constant temperature mode is unaffected by changes in ambient temperature. This improves the sensitivity of the heater when measuring the flow rate or pressure differential across the sensor.

For devices as shown in FIGS. 17 and 18, both may have a control circuit in the system to maintain the additional heaters 30a and 30b at a constant temperature. The setpoint (the temperature that the additional heaters are maintained at) for the constant temperature may be the same temperature every time the device is operated, or may vary dependent on ambient temperature conditions. Alternately, the control circuit could maintain the heaters 30a, 30b at a fixed temperature above the ambient temperature. This reduces power consumption of the device and allows a wider ambient temperature operating range.

The embodiments of FIGS. 17 and 18 show 2 wire heaters 30a, 30b on the edge of the membrane 2, however, there can be many variations of this. For example, there could be a single heater as a circular or rectangular ring located just inside the perimeter of the membrane, or 4 separate hot-wire heaters on either side of the perimeter of the membrane, or 2 or 4 heaters of a different shape.

REFERENCE NUMERALS

1. Flow sensor chip
2. Dielectric membrane
3. Second heating element
4. First heating element
5. Semiconductor substrate
6. Dielectric layer
7. Holes in dielectric membrane
8. Additional hotwires perpendicular to the direction of flow
9. Third sensing element
10. Package base substrate
11. Package sidewalls
12. Package lid
13. Circuit chip
14. Bond wires between the flow sensor chip and the circuit chip
15. Bond wires between the circuit chip and the package
20. First thermopile material
21. Second thermopile material
22. Thermopile junction
25. Thermopile
30. Holes in dielectric membrane
30a, 30b. Additional hotwires
80a. Additional hotwires parallel to the direction of flow The skilled person will understand that in the preceding description and appended claims, positional terms such as 'above', 'overlap', 'under', 'lateral', etc. are made with reference to conceptual illustrations of an device, such as those showing standard cross-sectional perspectives and those shown in the appended drawings. These terms are used for ease of reference but are not intended to be of limiting nature. These terms are therefore to be understood as referring to a device when in an orientation as shown in the accompanying drawings.

Although the disclosure has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the disclosure, whether alone or in any appropriate combination with any other feature disclosed or illustrated herein.

The invention claimed is:

1. A flow sensor comprising:
a first substrate comprising an etched portion;
a dielectric layer located on the first substrate, wherein the dielectric layer comprises at least one dielectric membrane located over the etched portion of the first substrate;
a first heating element located on or within the dielectric membrane;
a second heating element located on or within the dielectric membrane, wherein the first heating element and the second heating element are arranged to intersect one another within or over an area of the dielectric membrane; and
a controller coupled with the first heating element and the second heating element, and wherein the controller is configured to:
take a measurement from the second heating element;
determine a calibration parameter using the measurement from the second heating element;
take a measurement from the first heating element; and
determine a flow rate through the flow sensor or differential pressure across the flow sensor using the determined calibration parameter and the measurement from the first heating element.

2. A flow sensor according to claim 1, wherein, in use, the first heating element extends in a direction substantially perpendicular to the direction of flow through the sensor.

3. A flow sensor according to claim 1, wherein the second heating element is arranged at an angle of at least 10° to the first heating element.

4. A flow sensor according to claim 1, wherein, in use, the second heating element extends in a direction parallel to the direction of flow through the sensor.

5. A flow sensor according to claim 1, wherein the first heating element and the second heating elements are resistive hotwire heaters.

6. A flow sensor according to claim 1, wherein determining the calibration parameter comprises using the measurement from the first heating element and the second heating element.

7. A flow sensor according to claim 1, further comprising a third heating element, wherein the third heating element intersects the first heating element within or over an area of the dielectric membrane and intersects the second heating element within or over an area of the dielectric membrane; and optionally wherein the third heating element intersects the first heating element and the second heating element at a point where the first heating element and the second heating element intersect one another, and wherein the third heating element bisects an angle between the first heating element and the second heating element.

8. A flow sensor according to claim 1, wherein the dielectric membrane comprises at least one recessed region between one of the heating elements and an edge of the dielectric membrane.

9. A flow sensor according to claim 8, wherein the at least one recessed region is arranged to be symmetrical about axes defined by the first heating element and the second heating element; or
wherein the at least one recessed region is arranged to be asymmetrical about an axis defined by the first heating element.

10. A flow sensor according to claim 1, comprising one or more further sensing elements; and
   optionally wherein the one or more further sensing elements comprise one or more temperature sensors, pressure sensors, and/or gas sensors.

11. A flow sensor according to claim 10, wherein the one or more further sensing elements comprise at least a pair of sensing elements located on opposing sides of the first heating element or the second heating element; and
   optionally wherein the pair of sensing elements comprises a pair of temperature sensing elements or heating elements extending in a direction perpendicular to the direction of flow through the sensor.

12. A flow sensor according to claim 10, wherein the dielectric membrane comprises at least one recessed region located between one of the heating elements and at least one of the one or more further sensing elements.

13. A flow sensor according to claim 10, wherein at least one of the one or more further sensing elements is configured to measure a temperature difference across one of the heating elements.

14. A flow sensor according to claim 10, wherein at least one of the one or more further sensing elements is configured to measure a temperature difference between the dielectric membrane and the dielectric region above the first substrate.

15. A flow sensor according to claim 10, wherein the one or more further sensing elements comprise resistive temperature detectors, diodes, or thermopiles.

16. A flow sensor according to claim 1, wherein the etched portion of the first substrate extends partially through the thickness of the first substrate.

17. A flow sensor assembly comprising:
   a flow sensor housing; and
   a flow sensor according to claim 1 located within the flow sensor housing.

18. A flow sensor assembly according to claim 17, further comprising integrated circuitry connected to the flow sensor.

19. A flow sensor according to claim 1, wherein the controller is configured to take a measurement of a flow through the device from the second heating element to determine a calibration parameter.

20. A method of manufacturing a flow sensor, the method comprising:
   forming at least one dielectric membrane on a first substrate comprising an etched portion, wherein the dielectric membrane is over an area of the etched portion of the first substrate;
   forming a first heater on or within the dielectric membrane;
   forming a second heater on or within the dielectric membrane, wherein the first heater and the second heater are arranged to intersect one another within or over an area of the dielectric membrane; and
   forming a controller coupled with the first heating element and the second heating element, and wherein the controller is configured to:
   take a measurement from the second heating element;
   determine a calibration parameter using the measurement from the second heating element;
   take a measurement from the first heating element; and
   determine a flow rate or pressure differential through the flow sensor using the determined calibration parameter and the measurement from the first heating element.

* * * * *